United States Patent Office 3,418,335
Patented Dec. 24, 1968

3,418,335
PROCESS FOR OBTAINING TOCOPHEROLS
Susumu Nakanishi, Hopkins, Minn., assignor to
General Mills, Inc., a corporation of Delaware
No Drawing. Filed Apr. 12, 1966, Ser. No. 541,948
9 Claims. (Cl. 260—345.6)

ABSTRACT OF THE DISCLOSURE

A process for obtaining substantially sterol-free, tocopherol concentrates from materials containing a mixture of tocopherols and sterols by treatment of the mixture with a hydrogen halide to form solid, insoluble sterols in one phase and a tocopherol containing phase. Upon separation of the two phases, the tocopherols may be used to provide d-α-tocopherol (vitamin E).

---

This invention relates to a process of obtaining a substantially sterol-free tocopherol concentrate from materials containing a mixture of tocopherols and sterols and to a process of obtaining increased yields of d, α-tocopherol from a material containing a mixture of α and non-α tocopherols. In particular, the invention relates to the treatment of a material containing a mixture of sterols and tocopherols (both α and non-α) with a hydrogen halide to provide an insoluble sterol phase and a tocopherol containing phase. Upon separation of the two phases, the tocopherol phase containing both α and non-α tocopherols may be haloalkylated and reduced to provide d, α-tocopherol (vitamin E). As the sterols are separated herein from the tocopherols, this method also provides a process of providing relatively tocopherol-free sterols.

Sterols and tocopherols occur in natural fats and oils, particularly in vegetable oils. Such fats and oils are commonly subjected to deodorization treatment, providing a sludge by-product. This by-product is commonly referred to as deodorizer sludge, deodorizer distillate, hot-well scum, lighter-than-water scum, clabber stock, condenser oil, deodorizer trap oil, and catch basin scum. The sterols and tocopherols intially in the oil being deodorized are found in this sludge by-product. However, the concentration of sterols and tocopherols is still quite low. A typical sterol concentration therein is generally in the range of about 1 to 40% by weight while the tocopherol content therein is from about 1 to 30% by weight. Furthermore, deodorizer sludge is a very complex mixture containing sterol esters, tocopherol esters, sterol glycosides, fatty acid, fatty acid esters, mixed higher fatty acid glycerides, hydrocarbons, such as squalene, vitamin A, carotenoids, terpinoids and other materials. A large number of processes have been developed to separate sterols and tocopherols from the other components of deodorizer sludge. These processes are complex and expensive, and the separation of sterol from tocopherol is not substantially quantitative.

The present invention provides a novel and simple process of separating, substantially quantitatively, the sterols and tocopherols and provides a tocopherol concentrate which is a mixture of α and non-α tocopherols which provides increased conversion to d, α-tocopherol. While deodorizer sludge is a common material for use with the present invention, the invention is not to be limited thereto as it is applicable to any other material containing a mixture of sterols and tocopherols. Illustrative of such other materials are fats and oils such as sugar cane oil or vegetable oils such as soybean oil, with or without saponification of the oil.

Briefly, the present invention concerns the treatment of a material containing a mixture of sterols and tocopherols with a hydrogen halide, either gaseous or in an aqueous form, to form an insoluble sterol phase and a tocopherol containing phase. The solid sterols are then separated from the tocopherol phase by any conventional separation method such as filtration, centrifugation and the like and the tocopherol phase containing a mixture of α and non-α tocopherols is recovered. The sterol phase which contains a mixture of sterols such as campesterol, stigmasterol, and sitosterol may also be recovered for use in other processes. The tocopherol concentrate containing α and non-α tocopherols may then be haloalkylated and reduced to convert the non-α tocopherols to the desirable d, α-tocopherol form in improved yields.

As indicated, the initial treatment is with a hydrogen halide. Hydrogen chloride is the most common and is preferred. However, other hydrogen halides such as hydrogen bromide, hydrogen iodide, and hydrogen fluoride may be employed; however, hydrogen fluoride is less preferable. The hydrogen halide treatment may be accomplished by employing dry gas, as well as the aqueous form. The temperature of treatment is not critical, although the time of treatment will depend on the temperature employed. It is more desirable to conduct the treatment at room temperature or at reflux temperatures although temperatures below room temperature may be employed. The reflux temperature will depend on the particular solvent system employed. The treatment is conducted for a time period of from about 5 minutes to several hours (6 hours). Preferred conditions of treatment are for 10 minutes to 1 hour at about —20° C. to about 50° C. During the treatment with hydrogen halide, it appears that no hydrogen halide addition compounds of the sterols or halogenated sterols or hydrocarbons are provided.

It is generally preferred that the treatment be conducted in the presence of an inert organic solvent. However, the hydrogen halide treatment can be performed without the use of a solvent where the material being treated is of such a nature that the solid sterols formed may be recovered without the use of solvent. Where solvents are employed, inert organic solvents are preferred such as aliphatic hydrocarbons (i.e. hexane, heptane), petroleum ether, ethyl ether, acetone, ethylene dichloride, cyclohexane, cyclohexanone; as well as aromatic hydrocarbons such as benzene. The exact nature of the solvent is not critical so long as it is inert or unreactive with the material being treated and with the hydrogen halide.

The substantially sterol-free tocopherol concentrate recovered from the hydrogen halide treatment contains a mixture of α and non-α tocopherols. This concentrate can then be haloalkylated and reduced by methods such as described in U.S. Patents 2,486,539 and 2,486,542, to provide increased yields of d, α-tocopherol. There is thus provided by this invention a process of providing a high d, α-tocopherol concentrate through a hydrogen halide treatment, a haloalkylation and reduction reaction. The d, α-tocopherol concentrate can then be converted to desirable ester derivatives by conventional esterification procedures, either alkaline or acid catalyzed.

The haloalkylation reaction is preferably a chloromethylation achieved by reaction of the non-α tocopherols present with a solution (preferably ethereal solution) of formaldehyde in the presence of a hydrogen halide (such as hydrogen chloride). This results in the introduction of a chloromethyl group. Other haloalkyl groups may be introduced by using the corresponding aldehydes. This chloromethyl group or other haloalkyl group may then be converted into a methyl group or other alkyl group by a reduction procedure using stannous chloride and hydrochloric acid. Zinc and HCl reduction may also be employed although such is preferably employed in combination with stannous chloride which is preferred. A simultaneous chloromethylation and reduction may be conducted in a single step by adding the stannous chloride to the initial reaction mixture thereby forming a single stage process. Hydrogen halides other than hydrogen chloride may be employed such as hydrogen bromide or iodide. Hydrogen fluoride is operable, but is less preferable. In place of formalin, a polymer of formaldehyde such as paraformaldehyde may be employed to introduce the halomethyl group. The use of solvent increases the yield of α-tocopherol but the reaction may be carried out satisfactorily in the absence of solvent. The carrying out of the haloalkylation at reflux temperatures also increases the yield but the reaction may be carried out satisfactorily at room temperature (about 23° C.). The specific reflux temperature will depend on the nature of the particular inorganic solvent employed. Illustrative thereof are aliphatic hydrocarbons (hexane and heptane) acetone, methyl ethyl ketone, diethyl ether, triethylene-glycol dimethyl ether, and diethylene-glycol dimethyl ether. Acetone and the glycol ethers are preferred.

The d, α-tocopherol product can then be converted to the ester form which is a common commercial form. Illustrative of such esters are the acetate and succinate. While these are conventionally prepared by a base or alkali catalyzed esterification procedure, preferably employing pyridine, esterification can be achieved in a short period of time by an acid catalyzed esterification reaction. Preferably, sulfuric acid is employed and a sulfuric acid catalyzed esterification proceeds at room temperature in about one hour in substantially quantitative yield.

The invention can best be illustrated by means of the following examples:

Example 1

A partially processed soybean oil deodorizer sludge containing 29.3% total tocopherol (analysis by gas-liquid chromatography, G.L.C.; α-tocopherol 3.7%, β and γ-tocopherol 17.7%, Δ-tocopherol 7.9%) and 16.2% sterols (analysis by G.L.C.; 5.2% campesterol, 2.1% stigmasterol, 8.9% β-sitosterol), 100 g., was dissolved in 200 g. of n-hexane and dry hydrogen chloride gas was bubbled into the stirred solution at room temperature for one hour. Solid started to separate within a few minutes. After one hour, the reaction mixture was cooled in an ice-bath and the solid was filtered, dried to give 11.74 g., M.P. 135–136° C. (decomposition). Recrystallization of 11.7 g. from acetone-hexane furnished the first crop of 10.8 g., M.P. 139–140° C. (decomposition); $\lambda CCl_4$ 2.74μ (OH-stretching) and 9.50μ (OH-deformation); $\lambda^{KBr}$ 3.0μ (OH), 7.5μ ($\Delta^5$–3—OH), and 12.5μ ($C_6$-hydrogen). No chlorine was found by X-ray analysis.

The infrared analysis based on hydroxy absorption of 2.74μ and 9.50μ, showed the product consisted 100% sterols of which 8.3% was estimated to be stigmasterol.

The filtrate was evaporated in vacuo to give 36.27 g. containing 23.1% total tocopherol. Distillation of 20 g. of above material gave a fraction of 4.08 g., B.P. 220–237° C./0.3 mm. Hg having 50.3% of total tocopherol by G.L.C. analysis and 56.7% by Emmerie-Engel analysis and another fraction of 2.88 g. having 49.9% of total tocopherol by G.L.C. and 49.8% by Emmerie-Engel assay.

Example 2

A solution of 50 g. of a partially processed soybean oil deodorizer sludge containing 6.3% sterols (analysis by G.L.C., 1.9% campesterol, 0.4% stigmasterol, 4.0% β-sitosterol) and 35.1% total tocopherols (analysis by G.L.C., 5.7% α-tocopherol, 21.7% β+γ-tocopherol, and 21.7% Δ-tocopherol) in 100 ml. anhydrous ether was treated with anhydrous hydrochloric acid at room temperature for 30 minutes. The formed solid was filtered and dried to give 1.55 g., M.P. 134–135° C. (decomposition) $\lambda^{KBr}$ 3.0, 7.5 and 12.5μ. Recrystallization of 1.4 g. of above compound from acetone-hexane gave the first crop of 550 mg., M.P. 142–143° C.; $\lambda^{KBr}$ 3.0, 7.5 and 12.5μ; G.L.C. analysis 46.4% campesterol, 8.9% stigmasterol and 44.7% β-sitosterol. The second crop was 420 mg., M.P. 138–140° C., G.L.C. analysis 26.5% campesterol, 20.6% stigmasterol and 53.0% β-sitosterol. The third crop weighed 130 mg., M.P. 138–140° C. and the G.L.C. analysis showed it consisted of 10.4% campesterol and 89.6% sitosterol.

Example 3

A partially processed soybean oil deodorizer sludge (acid value 11.7, sap. value 22.4) containing 14.8% total sterols (by G.L.C., 5.1% campesterol, 1.5% stigmasterol, 8.2% β-sitosterol) and 41.7% total tocopherol (by G.L.C.), 25 g., was stirred with 5 ml. of conc. HCl at room temperature (25° C.) for 30 minutes, then the mixture was cooled to 0° C. and 40 ml. of n-hexane was added. The solid was filtered and dried to give 3.76 g., M.P. 121–124° C., $\lambda^{KBr}$ 3.0, 9.5 and 12.5μ. G.L.C. analysis showed the product consisted of 100% sterols. The filtrate was evaporated and dried in vacuo to give 20.95 g. of oil containing 38.8% of total tocopherols.

Example 4

A partially processed soybean oil deodorizer sludge having an acid value of 11.7 and saponification value of 22.4, and containing 14.8% of total sterols and 41.7% total tocopherols, 20 g., was dissolved in anhydrous ether and dry HCl was bubbled for 30 minutes at 25° C. with stirring. The formed crystalline materials were filtered and dried to give 3.8 g., M.P. 134–136° C.; $\lambda^{KBr}$ 3.0, 9.5, and 12.5μ. G.L.C. analysis showed that the compound consisted of 100% sterols mixture of campesterol, stigmasterol and β-sitosterol. The filtrate was concentrated, evaporated and dried in vacuo to give an oil of 14.8 g. having 40.2% total tocopherol and free of sterols.

Example 5

A solution of a partially processed soybean oil deodorizer sludge (acid value 11.7, sap. value 22.4) containing 14.8% total sterols and 41.7% total tocopherols, 20 g., in 40 g. of n-hexane was stirred with 5 ml. of aqueous HBr (48%) at 25° C. for 30 minutes and then the mixture was cooled in an ice-bath. The solid was filtered and dried to give 1.71 g., M.P. 135–137° C., $\lambda^{KBr}$ 3.0, 9.5, and 12.5μ and consisted of 100% sterols of campesterol, stigmasterol and β-sitosterol. The filtrate was evaporated and dried in vacuo to give 18.5 g. of oil containing 37.2% total tocopherols by G.L.C. analysis and free of sterols.

Example 6

(a) A partially processed soybean oil deodorizer sludge containing 6.3% sterols and 35.1% of tocopherols, 20 g., was dissolved in 40 g. of n-hexane and 5 ml. of 48% aqueous HBr was added and the mixture was stirred at room temperature (25° C.) for 30 minutes and then cooled in an ice-bath. The solid was filtered, dried to give 3.1 g., M.P. 136–139° C., $\lambda^{KBr}$ 3.0, 9.5, 12.5μ. G.L.C. analysis indicated the product was 100% sterols consisting of campesterol, β-sitosterol and stigmasterol. The filtrate was evaporated and dried in vacuo to give 18.6 g. of oil containing 26.9% total tocopherols and free of sterols.

(b) A partially processed soybean oil deodorizer sludge containing 6.3% sterols and 35.1% of tocopherols, 50 g., in 125 ml. n-hexane was treated with HCl gas at 25° C. for 30 min. to give 2.15 g. of solid, M.P. 134–140° C., consisting of 100% sterols.

Example 7

A mixture of 28.4 g. of a partially processed soybean oil deodorizer sludge containing 35.1% total tocopherols (analysis by G.L.C.; α-tocopherol 5.7% β and γ-tocopherol 21.7% Δ-tocopherol 7.7%) and 6.3% sterols (analysis by G.L.C., 1.9% campesterol, 0.4% stigmasterol and 4.0% β-sitosterol), and 5 ml. conc. HCl (36%) was stirred for 30 minutes at room temperature (25° C.). Then the mixture was cooled in an ice-bath, solid was filtered and washed with 100 ml. of cold hexane, dried and recrystallized from acetone-hexane gave 1.57 g., M.P. 134–135° C., $\lambda^{KBr}$ 3.0, 7.5, 12.5μ. G.L.C. analysis showed the product consisted of 100% sterols.

Example 8

A solution of 75 g. of a partially processed soybean oil deodorizer sludge having an acid value of 14.0 and a sap. value of 23.0 and containing 30.2% total tocopherol (3.0% α-tocopherol, 18.5% α+γ-tocopherol, 8.7% Δ-tocopherol) and 10% total sterols (3.7% campesterol, 0.8% stigmasterol, 5.5% β-sitosterol) in 750 g. (947 ml.) of methanol was stirred at 25° C. for 30 minutes. The methanol insolubles were separated, evaporated, and dried to give 26.25 g. of oily solid having 14.2% total tocopherol by G.L.C. and 8.7% total sterols. The oily solid, 20 g., was dissolved in n-hexane and 5 ml. of conc. (36%) HCl was added and the mixture was stirred for 30 minutes at 25° C. Then the mixture was cooled in ice-bath and the solid was filtered, washed with hexane and dried to give sterol crystals of 1.40 g., M.P. 136–137° C., $\lambda^{KBr}$ 3.0, 9.5, and 10.2μ. The hexane solubles and filtrate was evaporated, dried to give 16.2 g. of oil which contained 11.8% total tocopherol and less than 5% of sterols by G.L.C. analysis.

Example 9

A partially processed soybean oil deodorizer sludge containing 14.8% total sterols and 41.7% total tocopherols, 20 g., was dissolved in 50 ml. of tetrahydrofuran and was treated with dry HCl gas at 25° C. for 30 minutes. The mixture was concentrated and then cooled in an ice-bath. The solid formed was filtered and dried to give 1.98 g., M.P. 136–138° C., $\lambda^{KBr}$ 3.0, 9.5, and 12.5μ.

Example 10

(a) A partially processed soybean oil deodorizer sludge containing 10.0% total sterols (analysis by G.L.C., 3.4% campesterol, 0.6% stigmasterol and 6.0% β-sitosterol) and 10.9% total tocopherol (0.8% α, 6.5% β+γ, and 3.6% Δ-tocopherol) (acid value 16.0 and sap. value 34.6), 20 g., was dissolved in 50 ml. of n-hexane and was treated with dry HCl gas for 30 minutes at 25° C., and then cooled to 0° C. The solid formed was filtered and dried to give 1.3 g., M.P. 136–140° C., $\lambda^{KBr}$ 3.0, 9.5, 12.5μ. G.L.C. analysis showed 100% sterols consisting of campesterol, stigmasterol and β-sitosterol.

(b) A partially processed soybean oil deodorizer sludge containing 10.0% total sterol and 10.9% total tocopherol, 10 g., was dissolved in 25 ml. hexane and 2 ml. of 36% aqueous HCl was added and the mixture was stirred at 25° C. for 30 minutes, then was cooled to 0° C. The formed solid was filtered to give 0.65 g., M.P. 136–140° C., $\lambda^{KBr}$ 3.0, 9.5, 12.5μ. G.L.C. analysis showed 100% sterols consisting of campesterol, stigmasterol, and β-sitosterol.

Example 11

The 5 g. filtrate obtained in Example 7, containing 38.8% total tocopherols was dissolved in 10 g. of acetone and chloromethylated with 36% HCl and trioxymethylene followed by reduction with Zn dust and HCl to give 4.62 g. of oil having 30.0% α-tocopherol (by G.L.C. analysis).

Example 12

In order to illustrate that no hydrogen halide addition compounds or halogenated sterols or squalene are formed, the following experiments were conducted.

(a) Squalene (Eastman Org. Chem., 98%), 20 g., in 50 ml. anhydrous ether was treated with anhydrous HCl at 25° C. for 1 hr. No solid was formed during the reaction and upon cooling the reaction mixture at 0° C., no precipitate was formed. Ether was evaporated in vacuo; starting squalene was recovered which confirmed infrared analysis. X-ray analyses showed no chlorine in the recovered material.

(b) Squalene (Eastman Org. Chem., 98%), 20 g., was directly treated (without solvent) with dry HCl gas at 25° C. for 1 hour. No crystalline materials were formed upon cooling at 0° C., nor upon addition of benzene and alcohol. Infrared analysis on the recovered material was identical with starting material. Thus, indicated under the conditions used in this invention, formation of squalene hexahydrochloride (or squalene hexahydrobromide) did not proceed at all. The sterols separated are therefore free from squalene hexahydrohalides.

(c) β-sitosterol, 800 mg., in 20 ml. of anhydrous ether was treated with dry HCl gas at 25° C. for 30 min. It then was evaporated to dryness to give 800 mg., M.P. 132–134° C. G.L.C. and mass spectrum analysis showed the recovered material as starting β-sitosterol. X-ray analysis showed no chlorine.

(d) β-sitosterol, 800 mg., in 10 ml. n-hexane was treated with dry HCl at 25° C. for 1 hour which also showed the recovered material as starting β-sitosterol.

(e) Treatment of 800 mg. stigmasterol, M.P. 167.5–169.5° C., [α]$_D$ −51° C., in 20 ml. anhydrous ether with dry HCl at 25° C. for 1 hour recovered starting material, $\lambda^{KBr}$ 3.0, 9.5 12.5μ, M.P. 167.5–169.5.

Example 13

This example illustrates the hydrogen halide treatment of materials other than sludges. In this example sugar cane oil containing sterols, tocopherols, carotenoid pigments and wax were treated.

(a) Sugar cane oil, processed from crude sugar cane wax, was saponified with KOH under a usual manner to give 20.3% of unsaponifiables. The obtained unsaponifiables 1.5 g. was dissolved in 20 ml. of n-hexane, and HCl gas was bubbled at room temperature for 10 minutes. The formed solid was, after cooling at 0° C. separated by filtration to give 1.02 g. of crystalline material, M.P. 123–127° C., having 90.3% of sterols consisting of 20.5% campesterol, 19.5% stigmasterol, 41.4% β-sitosterol and 8.9% brassicasterol by G.L.C. analysis.

(b) Sugar cane oil was saponified to give 20.9% unsaponifiables and the obtained unsaponifiables, 1.75 g. was dissolved in 20 ml. of n-hexane. After HCl gas was bubbled for 10 minutes at room temperature, the mixture was cooled to 0° C. and the crystalline materials were filtered and dried to give 950 mg., 117–121° C., having 90.3% of sterols consisting of 20.5% campesterol, 19.5% stigmasterol, 41.4% β-sitosterol and 8.9% brassicasterol by G.L.C. analysis.

Example 14

A partially processed soybean oil deodorizer sludge containing 14.8% of total sterols (analyzed by G.L.C., 5.1% campesterol, 1.5% stigmasterol, 11.2% β-sitosterol) and 41.7% total tocopherol, acid value 11.7 and sap. value 22.4, 20 g., was dissolved in 60 ml. of acetone and 10 ml. of conc. 36% HCl was added and the mixture was cooled to 0° C. and stirred at 0° C. for 15 minutes. The formed crystalline material was filtered to give 1.14 g., M.P. 136–140° C., $\lambda^{KBr}$ 3.0, 9.5, 12.5μ. G.L.C. analysis showed 100% sterol consisting of campesterol, stigmasterol and β-sitosterol. The filtrate was then warmed to a room temperature and 10 ml. of conc. (36%) HCl, 2.94 g. of trioxymethylene, and 6.96 g. of SnCl$_2$·2H$_2$O were added. The mixture was heated at reflux at 60° C. for 1.5 hrs., then cooled to 15° C. and 4.84 g. of zinc dust and 2 ml. of conc. HCl were added and the mixture was stirred for one hour at 15–20° C., then was filtered, extracted with n-hexane, washed to neutrality, dried and evaporated to give 18.5 g. of oil consisting of 30.2% α-tocopherol.

Example 15

Hydrogen halide treatments of the sludge of Example 14 were carried out in various solvents at different temperatures and time. The results are summarized in Table I.

TABLE I.—HYDROGEN HALIDES TREATMENT OF A PARTIALLY PROCESSED SOYBEAN OIL DEODORIZER SLUDGE

| Amt. of sludge (g.) | HX | Solvent | Amt. (g.) | Temp. (° C.) | Time (min.) | Solid (g.) | Yield (percent) |
|---|---|---|---|---|---|---|---|
| 25 | 5 ml.HCl* | None | | 25 | 30 | 3.70 | 100 |
| 10 | HCl | Hexane | 20 | 25 | 15 | 1.24 | 84 |
| 10 | 3 ml.HCl* | do | 20 | 25 | 15 | 1.35 | 91 |
| 10 | HCl | do | 20 | 25 | 5 | 1.05 | 71 |
| 5 | HCl | do | 10 | 0 | 10 | 0.56 | 76 |
| 5 | HCl | do | 10 | 0 | 5 | 0.54 | 73 |
| 5 | HCl | do | 10 | −5 | 10 | 0.73 | 99 |
| 5 | HCl | do | 10 | −5 | 5 | 0.74 | 100 |
| 5 | HCl | do | 10 | −10 | 10 | 0.71 | 96 |
| 5 | HCl | do | 10 | −10 | 5 | 0.74 | 100 |
| 20 | 5 ml.HBr* | do | 40 | 25 | 30 | 1.71 | 58 |
| 20 | HCl | Ether | 40 | 25 | 30 | 2.95 | 100 |
| 20 | HCl | Methanol | 40 | 25 | 30 | None | |
| 20 | HCl | Tetrahydrofuran | 40 | 25 | 30 | 1.98 | 66 |
| 20 | HCl | Acetone | 40 | 25 | 30 | 2.20 | 100 |
| 5 | HCl | Ethylene dichloride | 10 | 25 | 5 | 0.92 | >100 |
| 5 | HCl | Iso-butyl alcohol | 10 | 25 | 5 | 0.02 | 2.7 |
| 5 | HCl | n-Amyl alcohol | 10 | 25 | 5 | None | |
| 5 | HCl | Benzene | 10 | 25 | 5 | 0.60 | 81 |
| 5 | 1.5 ml.HCl* | Cyclohexanone | 5 | 25 | 5 | 0.65 | 88 |

[1] All HX treatments were by anhydrous gas except those having (*) were aqueous, 36% HCl and 48% HBr, respectively.
[2] Melting points were omitted here. Identity of solid products were confirmed by infrared and gas-liquid chromatography, mass spectroscopy, and X-ray analysis to be pure sterols.

Example 16

This example illustrates that the methylation reaction (chloromethylation and reduction) proceeds better on hydrogen halide treated sludge than on non-treated ones. The sludge of Example 14 was employed. The results are summarized in Table II.

TABLE II.—RELATIONSHIP OF HYDROGEN HALIDE TREATMENT AND METHYLATION OF TOCOPHEROLS TO d,α-TOCOPHEROLS

| | HX-treatments | | | | | Methylation [1] | | | |
|---|---|---|---|---|---|---|---|---|---|
| Method | Sludge (g.) | Solid | | Filtrate | | HX-treated tocopherols (g.) | G. recovered | GLC, percent α | Yield percent |
| | | G. | GLC | G. | T.T. GLC, percent | | | | |
| None | | | | | | 10 | 9.16 | 30.5 | 67.0 |
| Gaseous HCl | 20 | 14.80 | 40.2 | 3.8 | 100% Sterols | 10 | 9.00 | 32.1 | 71.9 |
| Aqueous HCl | 25 | 20.95 | 38.8 | 3.76 | do | 5 | 4.62 | 30.0 | 71.5 |
| Aqueous HBr | 20 | 18.50 | 37.2 | 1.71 | do | 10 | 9.40 | 27.8 | 70.2 |

[1] Methylation of non-α-tocopherol to d,α-tocopherol was carried out with HCHO, HCl, SnCl₂ in acetone followed by Zn/HCl reduction.
[2] Aqueous HCl was 36% and aqueous HBr was 48% solution.

The embodiments of this invention in which an exclusive property or privilege is claimed are defined as follows:

1. A process of obtaining a substantially sterol-free tocopherol concentrate from a material containing a mixture of sterols and tocopherols comprising treating said material with a hydrogen halide thereby forming a solid sterol phase and a separate tocopherol phase and separating the sterol phase from the tocopherol phase thereby providing a substantially sterol-free tocopherol concentrate.

2. A process as defined in claim 1 wherein said hydrogen halide treatment is conducted in the presence of an inert organic solvent.

3. A process as defined in claim 1 wherein said treatment is conducted at a temperature in the range of −20° C. to about 50° C.

4. A process as defined in claim 1 wherein said material is deodorizer sludge.

5. A process as defined in claim 1 wherein said material is a vegetable oil.

6. A process as defined in claim 1 wherein said hydrogen halide is hydrogen chloride.

7. A process as defined in claim 1 wherein said hydrogen halide is in the form of an anhydrous gas.

8. A process as defined in claim 1 wherein said hydrogen halide is in an aqueous form.

9. A process as defined in claim 1 wherein said hydrogen halide is hydrogen bromide.

References Cited

UNITED STATES PATENTS

| 2,704,764 | 3/1955 | Mattikow et al. | 260—345.6 |
| 2,998,430 | 8/1961 | Sevigne | 260—345.6 |
| 3,122,565 | 2/1964 | Kijima | 260—345.6 |
| 3,153,054 | 10/1964 | Brown | 260—345.6 |
| 3,187,011 | 6/1965 | Sevigne | 260—345.6 |

HENRY R. JILES, *Primary Examiner.*

J. M. FORD, *Assistant Examiner.*